US012596335B2

(12) United States Patent
Belisle et al.

(10) Patent No.: US 12,596,335 B2
(45) Date of Patent: Apr. 7, 2026

(54) RELAY DRIVE SYSTEMS

(71) Applicant: Hamilton Sundstrand Corporation, Charlotte, NC (US)

(72) Inventors: Francis C. Belisle, Beloit, WI (US); Joshua C. Swenson, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1002 days.

(21) Appl. No.: 17/521,395

(22) Filed: Nov. 8, 2021

(65) Prior Publication Data

US 2023/0144978 A1 May 11, 2023

(51) Int. Cl.
| | |
|---|---|
| *G05B 9/02* | (2006.01) |
| *H01H 9/54* | (2006.01) |
| *H01H 11/00* | (2006.01) |
| *H01H 47/00* | (2006.01) |

(52) U.S. Cl.
CPC ................. *G05B 9/02* (2013.01); *H01H 9/54* (2013.01); *H01H 47/002* (2013.01); *H01H 11/0062* (2013.01); *H01H 2047/009* (2013.01)

(58) Field of Classification Search
CPC .......... G05B 9/02; H01H 9/54; H01H 47/002; H01H 11/0062; H01H 2047/009
See application file for complete search history.

(56) References Cited

U.S. PATENT DOCUMENTS

| | | | | |
|---|---|---|---|---|
| 4,728,810 | A | * | 3/1988 | Engel ................... H01H 47/002 |
| | | | | 307/108 |
| 6,148,258 | A | | 11/2000 | Boisvert et al. |
| 6,233,132 | B1 | | 5/2001 | Jenski |
| 7,705,601 | B2 | | 4/2010 | Zhou et al. |
| 9,752,990 | B2 | * | 9/2017 | Chian ..................... F23N 1/002 |
| 11,719,751 | B2 | * | 8/2023 | Gabrielsson ........... H01H 50/08 |
| | | | | 324/418 |
| 2015/0090310 | A1 | | 4/2015 | Chian et al. |
| 2018/0233312 | A1 | * | 8/2018 | Pullmann ............... H01H 47/04 |

FOREIGN PATENT DOCUMENTS

| | | | |
|---|---|---|---|
| EP | 2845211 | B1 | 4/2016 |
| EP | 3799094 | A1 | 3/2021 |
| JP | 03097352 | | 10/2000 |
| WO | 2008064694 | A1 | 6/2008 |
| WO | 2013189527 | A1 | 12/2013 |
| WO | 2019141529 | A1 | 7/2019 |

OTHER PUBLICATIONS

Extended European Search Report, of the European Patent Office, dated Mar. 24, 2023, in corresponding European Patent Application No. 22206186.3.
Office Action issued May 13, 2025 in connection with European Patent Application No. 22 206 186.3, 10 pages.

* cited by examiner

*Primary Examiner* — Reena Aurora

(57) ABSTRACT

A drive system for a switch can include a control module configured to control, directly or indirectly, a state of a switch between a first state and a second state. The drive system can also include a transition timing system configured to measure a transition time that the switch is in transit between the first state and the second state.

20 Claims, 3 Drawing Sheets

99

200

201

Turn on Contactor

Start Transition Timer

Wait until the voltage
turn on transients subside
(blanking time)

Detect voltage spike
when armature stops

Stop Transition Timer

Report Turn On
Transition Time

RELAY DRIVE SYSTEMS

FIELD

This disclosure relates to electrical relay drive systems.

BACKGROUND

Electromechanical relay coils create electromotive force when current is passed through the coil (e.g., to move an armature which has switch contacts attached). In relays (commonly referred to as contactors), there can be springs, sliding surfaces, and small clearances, which have the potential for wear causing changes in the armature's motion rate of acceleration due to the electromotive force. The wear is often a slow build up that causes the relay to move slower and could eventually cause a complete failure to open or close. Traditional relay coil drives only provide a status of movement via a secondary switch after a relay drive command. As power levels increase, if the opening or closing time of the relay increases, there is increase in damage to the electrical arcing contacts, which further accelerates the relay's degradation to failure.

Such conventional methods and systems have generally been considered satisfactory for their intended purpose. However, there is still a need in the art for improved relay drive systems. The present disclosure provides a solution for this need.

SUMMARY

A drive system for a switch can include a control module configured to control, directly or indirectly, a state of the switch between a first state and a second state. The drive system can also include a transition timing system configured to measure a transition time that the switch is in transit between the first state and the second state. The drive system can include a health monitoring module operatively connected to the transition timing system to receive the transition time and to determine a wear condition of the switch based on the transition time.

In certain embodiments, the drive system can include a drive line operatively connected between a voltage supply and a contactor coil of the switch, and a drive switch disposed on the drive line and operatively connected, directly or indirectly, to the control module. The drive switch can be configured to pass a voltage from the voltage supply to the contactor coil of the switch in a closed state, and to prevent voltage from passing to the contactor coil in an open state. In certain embodiments, the drive system can include a driver operatively connected to the control module to drive the drive switch between an open and closed state based on control signals from the control module.

In certain embodiments, the transition timing system can include a voltage spike detector operatively connected to the drive line and configured to detect a voltage spike associated with a slowing or stopping of motion of an armature of the switch. The transition timing system can include a timer module operatively connected to the control module to receive a start signal therefrom indicating a start of a transition between the first state and the second state. The timer module can be operatively connected to the voltage spike detector to receive a spike signal therefrom indicative of the voltage spike associated with a slowing or stopping of motion of the armature of the switch. The timer module can be configured to output the transition time based on a difference of time between the start signal and the spike signal.

In certain embodiments, the transition timing system can include a blanking time module disposed between the voltage spike detector and the timer module. The blanking time module can be operatively connected to the control module to receive the start signal therefrom indicating the start of the transition between the first state and the second state. The blanking time module can be configured to prevent a spike signal from passing to the timer module for a set period of time after receiving the start signal to prevent transient voltage spikes from prematurely stopping the timer module.

The blanking time period can be at least an order of magnitude faster than a total transition time of the switch, for example. Any suitable blanking time period is contemplated herein.

The health monitoring module can be configured to receive the transition time from the timer module to determine a wear condition of the switch. In certain embodiments, the control module can be configured to output a cycle count with each cycle of the switch. The health monitoring module can be configured to receive the cycle count and determine an estimate remaining life of the switch based on data.

The health monitoring module can be configured to determine an average transition time. If the average transition time increases above an end of life threshold, the health monitoring module can configured to output an end of life signal in certain embodiments. If the transition time increases above a failure threshold, the health monitoring module can be configured to output a failure signal in certain embodiments. If the average transition time increases above the end of life threshold, and if the cycle counter is below an estimated cycle life total, the health monitoring module can be configured to output a premature end of life signal indicating that the switch is failing before the expected cycle life total. Any suitable function for reporting the health of the switch is contemplated herein.

In accordance with at least one aspect of this disclosure, a switch system can include a switch having a contactor coil and an armature, and a drive system for driving the switch between a first state and a second state. The drive system can be any suitable drive system disclosed herein, e.g., as described above.

In accordance with at least one aspect of this disclosure, a method can include measuring a transition time between a first state of a switch and a second state of a switch, and determining a health of the switch based on the transition time. Measuring the transition time can include turning on a contactor to provide voltage to a coil of the switch to move an armature of the switch from a first position to a second position, starting a transition timer when the contactor is turned on, waiting until the voltage turn-on transients subside for a blanking time, detecting a voltage spike when the armature stops after the blanking time, stopping the transition timer when the voltage spike is detected after the blanking time, and reporting the turn-on transition time.

In certain embodiments, measuring the transition time can include turning off the contactor to cut off voltage to the coil of the switch to move an armature of the switch from the second position to the first position, incrementing a cycle count when the contactor is turned off, starting a transition timer when the contactor is turned off, waiting until the voltage turn-off transients subside for a second blanking time, detecting a voltage spike when the armature stops after the second blanking time, stopping the transition timer when the voltage spike is detected after the second blanking time, and reporting the turn-off transition time. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
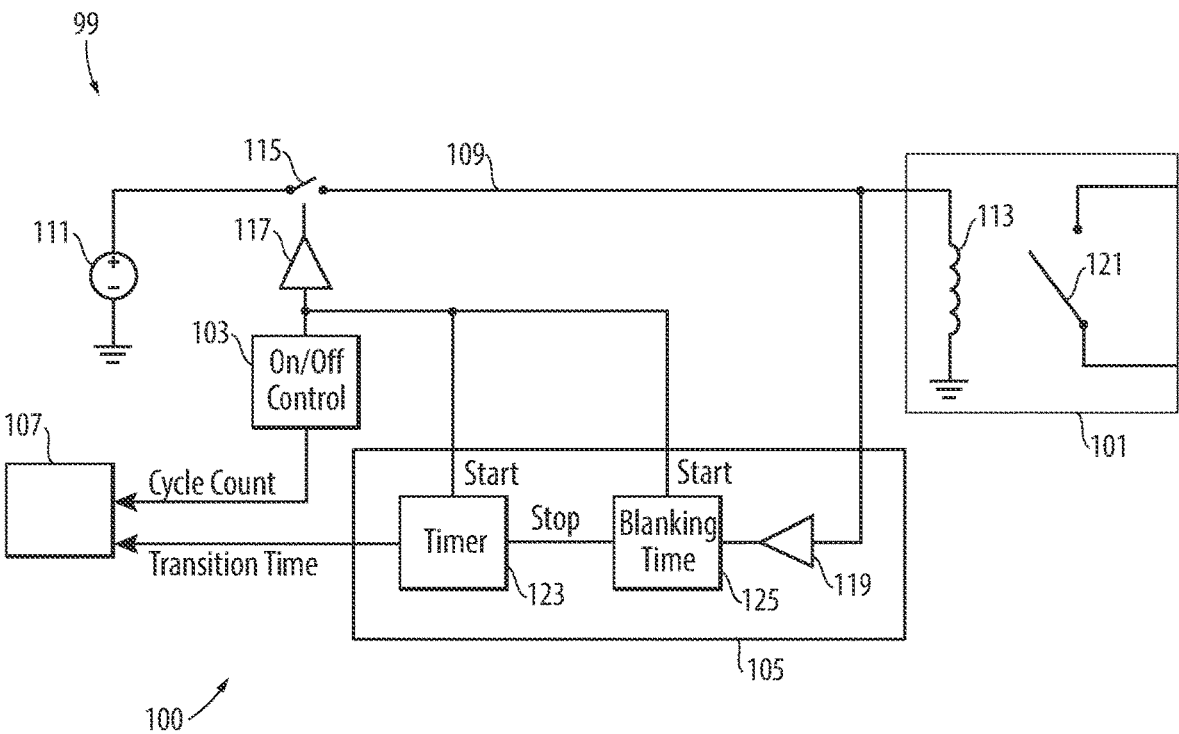
FIG. 1 is a schematic diagram of an embodiment of a drive system in accordance with this disclosure.
Figure 2:
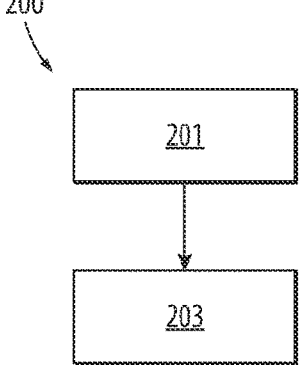
FIG. 2 is a flow diagram of an embodiment of a method in accordance with this disclosure.
Figure 3:
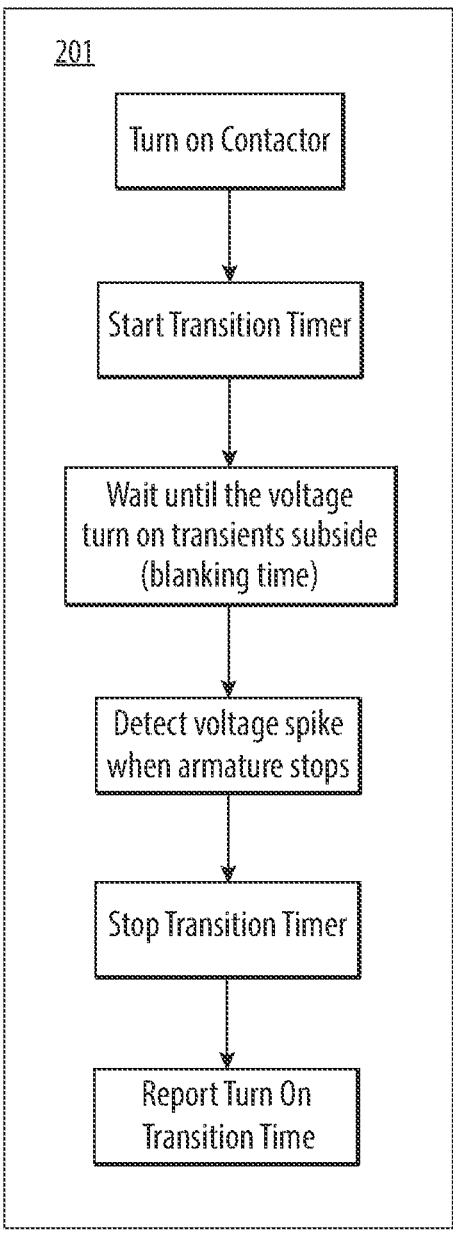
FIG. 3 is a flow diagram of an embodiment of a portion of the method of FIG. 2 in accordance with this disclosure.
Figure 4:
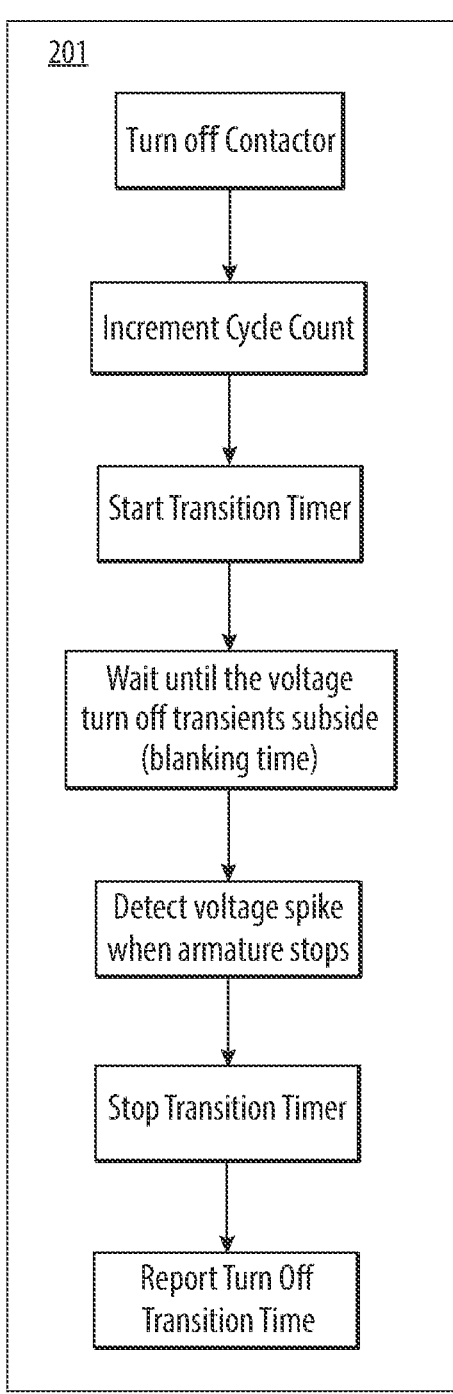
FIG. 4 is a flow diagram of an embodiment of a portion of the method of FIG. 2 in accordance with this disclosure.

Reference will now be made to the drawings wherein like reference numerals identify similar structural features or aspects of the subject disclosure. For purposes of explanation and illustration, and not limitation, an illustrative view of an embodiment of a drive system in accordance with the disclosure is shown in FIG. 1 and is designated generally by reference character 100. Other embodiments and/or aspects of this disclosure are shown in FIGS. 2-4.

Referring to FIG. 1, a drive system 100 for a switch 101 (e.g., an electromechanical relay switch) can include a control module 103 configured to control, directly or indirectly, a state of the switch between a first state (e.g., a closed/ON state) and a second state (e.g., an open/OFF state, e.g., as shown in FIG. 1). The control module 103 can include any suitable hardware and/or software to cause the switch 101, directly or indirectly, to change between states.

The drive system 100 can also include a transition timing system 105 configured to measure a transition time that the switch 101 is in transit between the first state and the second state. In certain embodiments, the drive system 100 can include a health monitoring module 107 operatively connected to the transition timing system 105 to receive the transition time and to determine a wear condition of the switch 101 based on the transition time.

In certain embodiments, the drive system 100 can include a drive line 109 operatively connected between a voltage supply 111 and a contactor coil 113 of the switch 101, and a drive switch 115 disposed on the drive line 109 and operatively connected, directly or indirectly, to the control module 103. The drive switch 115 can be configured to pass a voltage from the voltage supply 111 to the contactor coil 113 of the switch 101 in a closed state, and to prevent voltage from passing to the contactor coil 113 in an open state (e.g., as shown in FIG. 1). In certain embodiments, the drive system 100 can include a driver 117 operatively connected to the control module 103 to drive the drive switch 115 between an open and closed state based on control signals from the control module 103. For example, the control module 103 can activate the driver 117 to close the drive switch 115. The driver 117 and the control module 103 can be integrated or separate in any suitable manner.

Embodiments can include a high-side switch arrangement, e.g., as described above. An alternate arrangement can be a low-side switch arrangement where the power supply 111 is always connected to the coil 113 and the ground is selectively applied through a switch 115. Any other suitable method or system to selectively apply energy to the contactor coil 113 is contemplated herein.

In certain embodiments, the transition timing system 105 can include a voltage spike detector 119 operatively connected to the drive line and configured to detect a voltage spike associated with a slowing or stopping of motion of an armature 121 of the switch 101. The transition timing system 105 can include a timer module 123 operatively connected to the control module 103 to receive a start signal (e.g., a control signal for controlling driver 117 and/or drive switch 115) therefrom indicating a start of a transition between the first state and the second state of the switch 101. The timer module 123 can be operatively connected to the voltage spike detector 119 to receive a spike signal therefrom indicative of the voltage spike associated with a slowing or stopping of motion of the armature 121 of the switch 101. The timer module 123 can be configured to output the transition time based on a difference of time between the start signal and the spike signal.

In certain embodiments, e.g., as shown, the transition timing system 105 can include a blanking time module 125 disposed between the voltage spike detector 119 and the timer module 123. The blanking time module 125 can be operatively connected to the control module 107 to receive the start signal therefrom indicating the start of the transition between the first state and the second state of the switch 101. The blanking time module 125 can be configured to prevent a spike signal from passing to the timer module 123 for a set period of time after receiving the start signal to prevent transient voltage spikes from prematurely stopping the timer module 123.

The blanking time period can be at least an order of magnitude faster (e.g., about 50 microseconds) than a total transition time of the switch 101 (e.g., about 10-30 milliseconds), for example. Any suitable blanking time period is contemplated herein (e.g., suitable to prevent transient turn-on spikes from stopping the timer).

The health monitoring module 107 can be configured to receive the transition time from the timer module 123 to determine a wear condition of the switch 101. In certain embodiments, the control module 103 can be configured to output a cycle count with each cycle of the switch 101 (e.g., from off to on and back to being one cycle). The health monitoring module 107 can be configured to receive the cycle count and determine an estimate remaining life of the switch 101 based on data (e.g., stored in a non-transitory computer readable medium of the health monitoring module 107). For example, the health monitoring module 107 can be configured to output a percentage of remaining life based on the cycle count and associated lifetime data. Any suitable method for determining health is contemplated herein.

The health monitoring module 107 can be configured to determine an average transition time. If the average transition time increases above an end of life threshold, the health monitoring module 107 can configured to output an end of life signal in certain embodiments. If the transition time increases above a failure threshold, the health monitoring module 107 can be configured to output a failure signal in certain embodiments. If the average transition time increases above the end of life threshold, and if the cycle counter is below an estimated cycle life total, the health monitoring module 107 can be configured to output a premature end of life signal indicating that the switch 101 is failing before the expected cycle life total. Any suitable function for reporting the health of the switch 101 is contemplated herein.

In accordance with at least one aspect of this disclosure, a switch system 99 can include a switch 101 having a contactor coil 113 and an armature 121, and a drive system 100 for driving the switch 101 between a first state and a second state. The drive system 100 can be any suitable drive system 100 disclosed herein, e.g., as described above.

In accordance with at least one aspect of this disclosure, referring additionally to FIG. 2, a method 200 can include measuring (e.g., at block 201) a transition time between a first state of a switch and a second state of a switch, and determining a health of the switch based on the transition time. As shown in FIG. 3, measuring (e.g., at block 201) the transition time can include turning on a contactor by providing voltage to a coil of the switch to move an armature of the switch from a first position to a second position, starting a transition timer when the contactor is turned on, waiting until the voltage turn-on transients subside for a blanking time, detecting a voltage spike when the armature stops after the blanking time, stopping the transition timer when the voltage spike is detected after the blanking time, and reporting the turn-on transition time.

In certain embodiments, referring to FIG. 4, measuring (e.g., at block 201) the transition time can include turning off the contactor by cutting off voltage to the coil of the switch to move an armature of the switch from the second position to the first position, incrementing a cycle count when the contactor is turned off, starting a transition timer when the contactor is turned off, waiting until the voltage turn-off transients subside for a second blanking time, detecting a voltage spike when the armature stops after the second blanking time, stopping the transition timer when the voltage spike is detected after the second blanking time, and reporting the turn-off transition time.

The portions of a method in FIGS. 3 and 4 can be successive or can be independent of each other. In certain embodiments, only the portion of the method of FIG. 3 or FIG. 4 may be performed. The method can include any other suitable method(s) and/or portion(s) thereof.

Embodiments can include an electronic relay drive circuit that can include pull-in current power protection (e.g., over current protection). Embodiments can also include the functionality of monitoring voltage closing operation by the back electromagnetic force (EMF) spike. Embodiments can monitor power actuation cycle counter and record the actuation cycles accordingly.

In embodiments, when the driver is turned on, there can be an inrush of current on the coil which creates the magnetic field to push armature. Then there can be a current that pushes the armature to full position. A reluctance change can cause a voltage spike when the armature slows down when reaching the opposite position.

Embodiments can utilize a bi stable switch or an electrically held switch, for example. A bi stable switch is pulse from position to position, and an electrically held switch is where power is kept on to hold the armature in an on position, for example. Embodiments of a drive system can be utilized with either type, or any other suitable type of switch. Embodiments can be applied to any solenoid type device, not only contactor switches.

Embodiments can include a blanking time module to ignore the initial transient spikes that occur when you switch power on or off (e.g., usually in the 10's of microseconds, but can vary depending on the dynamics of the system). This can prevent the timer from stopping early. For certain switches, total movement time can be about 10-30 milliseconds (e.g., for relays), so the blank time can be selected to be a much smaller number. The blank time can be any suitable time long enough to cover transients, but shorter than the transient time of the armature. In certain embodiments, the blanking time can be any amount of time less than the movement time of armature.

Embodiments can include logic that can read the transient time and determine a health of switch. In certain switches, when end of life is approaching, the average time increases about 50%. Average time can be thus monitored which can also filter out transients. One having ordinary skill can define average time metrics for the life cycle of a particular switch which varies as a function of the mechanical layout, for example, of each switch. Also, a cycle counter can be correlated with timing health (relative to an expected number of total cycles from a part, for example) to determine what type of failure there is (e.g., defect, normal wear), and embodiments can provide statistics for reliability analysis in a system of a broader structure (such that if switches fail faster in a particular place, this can be recognized). Also, a counter can be used as a backstop life limiter to cause replacement after certain cycles, for example.

Embodiments can include an electronic relay drive with operation performance monitoring for system predictive heath monitoring (PHM). Actuation time to operate (e.g., close after application of coil power) is dependent on resistance of coil circuit and armature support interface friction and wear conditions. Actuation time to release (e.g., open after removal of coil power) is dependent on stored energy in the coil and wiring inductance and armature/support interface friction and wear conditions. Coil voltage spike on the circuit wiring occurs when the armature starts to accelerate after the coil motor magnetic field is formed (e.g., referred to as in-rush). Coil voltage spike on the circuit wiring occurs when the armature starts when deceleration occurs when the armature comes the end of it's travel. By monitoring the differential time between coil voltage ON (from the drive circuit) to the Coil voltage transient spike the actuation time for the armature motion can be calculated and recorded.

Embodiments can provide functionality of monitoring and recording actuation operate time from application of coil drive power to voltage transient spike (back EMF). Embodiments can provide functionality of monitoring and recording actuation release (turn off) time from removal of coil drive power to voltage transient spike (back EMF). IF the circuit monitors the actuation time to be greater than a maximum limit, the part may have failed to operate correctly.

The circuit can record and create a moving average of time to monitor changes in actuation motion time. Embodiments can provide an electronic coil drive and monitoring circuit which provides a predictive health monitoring approach for electromagnetic relays. Embodiments can provide a relay electronic drive circuit with monitoring of coil voltage versus armature movement effect, where the change in motion either acceleration or deceleration of the armature in the coil magnetic field causes a voltage spike.

In embodiments, at application of coil drive power (voltage to the coil) there is an in-rush for magnetizing circuit before the armature starts moving (accelerating), the voltage applied point is the start time for relay actuation. At end of the armature acceleration which is at the end of the armature travel, there is sudden deceleration of the armature in the coil produced magnetic field which causes a voltage transient spike representing the completion time for the relay armature actuation. By monitoring the differential time between coil voltage ON (from the drive circuit) to the Coil voltage transient spike the actuation time for the armature motion can be calculated and recorded. The drive circuit can monitor the actuation time for greater than a maximum limit to detect degradation.

The drive circuit would record and create an average or moving average of time to predict changes in relay actuation motion time. When a relay armature is moving though the stator (motor) coil field and comes to a stop there is a voltage spike. When the coil voltage is turned off and the armature moves back thru the coil field and while the coil voltage is collapsing there is a voltage spike. In both cases there is a voltage spike (aka back electromotive force (EMF) spike) when the armature stops and bounces at the end of the travel.

Embodiments can provide a Predictive Health Monitoring (PHM) circuit on the electronic coil drive circuit that measures the time from command ON (or Release OFF) and to the time when the voltage spike occurs due to armature movement and measure number or time of bouncing voltage. If the mechanical device's system is starting to wear, friction build up, debris, spring fatigue, etc., the closing time will increase and the opening time will increase, and the bounce time could be increasing.

The drive circuit can report out the time from command to bounce, and then report out if the average has doubled (or reached any other suitable metric). In this way the switching drive circuit/system counts cycles of coil drive commands, measures time of actuation, and mechanical response (actuation) bounce time to indicate change in the component (or LRU) due to wear or unusual operating conditions. Detecting the length of time the coil takes to move, assuming the voltage spikes are large enough to reliably distinguish them from noise. Embodiments can include an analog front end to amplify and detect the spike and a comparator to create a digital signal when a spike occurs. Embodiments can include a logic (microprocessor or FPGA) that has a timer circuit.

Embodiments can provide cycle counting. Relays have operating life cycle requirements. When a component position gets close to the design life limit, a maintenance message can be sent. Message can be be cleared or reset after evaluation of component history or action. Embodiments can provide a Relay electronic drive circuit with monitoring of coil voltage versus armature movement effect, where the change in motion either acceleration or deceleration of the armature in the coil magnetic field causes a voltage spike. At application of coil drive voltage there is a current in-rush for magnetizing circuit before the armature starts moving and at end of the armature acceleration, there is sudden deceleration of the armature in the coil magnetic field which causes a voltage transient spike representing the completion of the relay armature actuation. By monitoring the time between coil voltage ON to the Coil voltage transient spike the actuation time for the armature motion can be calculated and monitored for component function.

Embodiments can provide a relay electronic drive circuit with monitoring of coil voltage versus armature movement effect would be able to indicate that a relay moveable part friction or coil wiring magnetization problem is causing degradation in operate time. The monitoring of armature opening (e.g., after power off) movement time provides indication of the condition (e.g., frictional condition) on movable sliding surfaces, damage or worn internal springs, and/or partial welding of the electrical contacts to allow for planned component replacement. By monitoring the number of relay power cycles for a functional position, the potential for failure due to extended operation beyond life cycles can be prevented or data to provide how many cycles a component has at a maintenance point. The PHM functions can be maintenance messages if triggered, but not change the system operation for the electronic coil drive.

The PHM functions can allow for preventive maintenance on relays that if failed would cause a failure to dispatch on time or cause the power system to be operate in alternate operating mode from normal. Modern relays are now used at higher power and require improved reliability to prevent predicable failures. Embodiments of a PHM approach allow existing power relays to be used in a system at higher power and still provide good system reliability and on-time aircraft dispatch (e.g., in aviation applications).

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A drive system for a switch, comprising:
a control module configured to control, via a control signal, a state of the switch between a first state and a second state;
a transition timing system configured to measure, via a timer module, a transition time that the switch is in transit between the first state and the second state; and
a health monitoring module configured to receive the transition time and to determine a wear condition of the switch based on the transition time.

2. The drive system of claim 1, further comprising:
a drive line operatively connected between a voltage supply and a contactor coil of the switch; and
a drive switch disposed on the drive line and operatively connected to the control module, wherein the drive switch is configured to pass a voltage from the voltage supply to the contactor coil of the switch in a closed state and to prevent the voltage from passing to the contactor coil in an open state.

3. The drive system of claim 2, further comprising:

a driver operatively connected to the control module and configured to drive, via the control signal, the drive switch between the open and closed states based on control signals from the control module.

4. The drive system of claim 2, wherein the transition timing system includes the timer module, and a voltage spike detector operatively connected to the drive line and configured to detect a voltage spike associated with a slowing or stopping of motion of an armature of the switch.

5. The drive system of claim 4, wherein:

the timer module is operatively connected to the control module and is configured to receive a start signal therefrom indicating a start of a transition between the first state and the second state, the timer module is operatively connected to the voltage spike detector and is configured to receive a spike signal therefrom indicative of the voltage spike associated with a slowing or stopping of motion of the armature of the switch, and the timer module is configured to output the transition time based on a difference of time between the start signal and the spike signal.

6. The drive system of claim 5, further comprising:

a blanking time module disposed between the voltage spike detector and the timer module, wherein the blanking time module is operatively connected to the control module and is configured to receive the start signal therefrom indicating the start of the transition between the first state and the second state, and wherein the blanking time module is configured to prevent a spike signal from passing to the timer module for a set blank time period of time after receiving the start signal to prevent transient voltage spikes from prematurely stopping the timer module.

7. The drive system of claim 6, wherein a blanking time period is at least an order of magnitude faster than a total transition time of the switch.

8. The drive system of claim 7, wherein the health monitoring module is configured to receive the transition time from the timer module and determine a wear condition of the switch.

9. The drive system of claim 8, wherein:

the control module is configured to output a cycle count with each cycle of the switch, and the health monitoring module is configured to receive the cycle count and determine an estimate remaining life of the switch based on data including the cycle count.

10. The drive system of claim 9, wherein the health monitoring module is configured to determine an average transition time.

11. The drive system of claim 10, wherein, if the average transition time increases above an end of life threshold, the health monitoring module is configured to output an end of life signal.

12. The drive system of claim 11, wherein, if the average transition time increases above the end of life threshold and the cycle count is below an estimated cycle life total, the health monitoring module is configured to output a premature end of life signal indicating that the switch is failing before an expected cycle life total.

13. The drive system of claim 10, wherein, if the transition time increases above a failure threshold, the health monitoring module is configured to output a failure signal.

14. The drive system of claim 1, wherein:

the first state is an off state; and the second state is an on state.

15. The drive system of claim 1, wherein:

the first state is an on state; and the second state is an off state.

16. A switch system, comprising:

a switch having a contactor coil and an armature; and a drive system for driving the switch between a first state and a second state, the drive system comprising:

a control module configured to control, via a control signal, a state of the switch between the first state and the second state;

a transition timing system configured to measure, via a timer module, a transition time that the switch is in transit between the first state and the second state; and a health monitoring module configured to receive the transition time and to determine a wear condition of the switch based on the transition time.

17. The switch system of claim 16, further comprising:

a drive line operatively connected between a voltage supply and a contactor coil of the switch; and a drive switch disposed on the drive line and operatively connected to the control module, wherein the drive switch is configured to pass a voltage from the voltage supply to the contactor coil of the switch in a closed state and to prevent the voltage from passing to the contactor coil in an open state.

18. A method, comprising:

measuring, via a transition timer, a transition time between a first state of a switch and a second state of the switch; and determining a health of the switch based on the transition time;

wherein measuring the transition time includes:

starting a transition timer;

after starting the transition timer, waiting until voltage turn-on transients subside for a blanking time period;

after the blanking time period has concluded, detecting a voltage spike;

stopping the transition timer when the voltage spike is detected; and reporting a turn-on transition time.

19. The method of claim 18, wherein:

measuring the transition time further includes turning on a contactor to provide voltage to a coil of the switch to move an armature of the switch from a first position to a second position;

the transition timer is started when the contactor is turned on; and the voltage spike is detected when the armature stops after the blanking time period has concluded.

20. The method of claim 19, wherein measuring the transition time further includes:

turning off the contactor to cut off the voltage to the coil of the switch to move the armature of the switch from the second position to the first position;

incrementing a cycle count when the contactor is turned off;

starting the transition timer when the contactor is turned off;

waiting until voltage turn-off transients subside for a second blanking time period;

detecting a second voltage spike when the armature stops after the second blanking time period has concluded;

stopping the transition timer when the second voltage spike is detected after the second blanking time period has concluded; and reporting a turn-off transition time.

* * * * *